July 3, 1962        G. B. JACOBY        3,041,837
MASTER CYLINDER RESERVOIR
Filed July 29, 1960
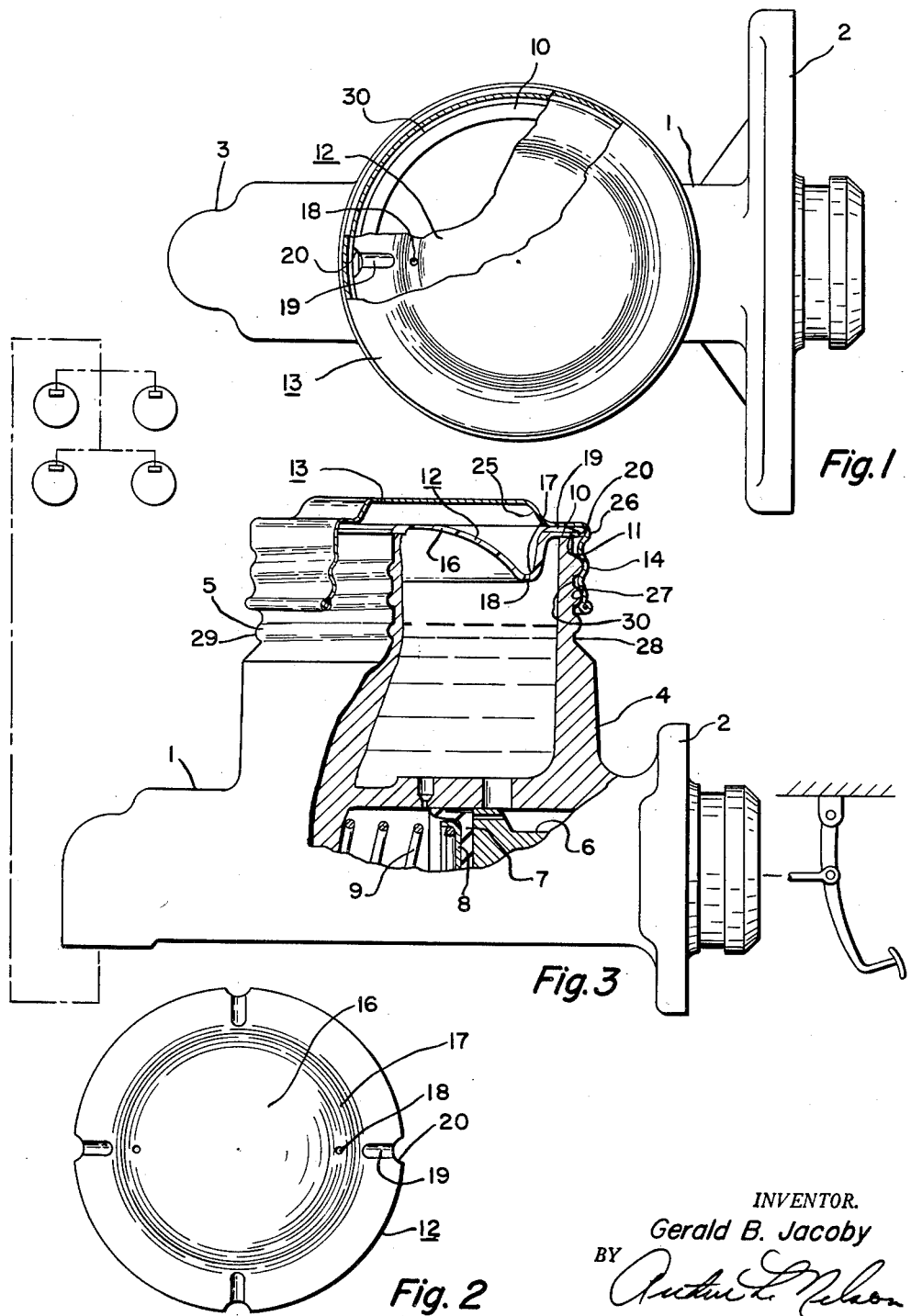
INVENTOR.
Gerald B. Jacoby
BY
His Attorney United States Patent Office 3,041,837
Patented July 3, 1962

3,041,837
MASTER CYLINDER RESERVOIR
Gerald B. Jacoby, Dayton, Ohio, assignor to General Motors Corporation, Detroit, Mich., a corporation of Delaware
Filed July 29, 1960, Ser. No. 46,136
6 Claims. (Cl. 60—54.6)

This invention relates to a vehicle brake and more particularly to a splash-proof master cylinder reservoir cover.

The conventional brake actuating fluid system includes a master cylinder having a fluid reservoir vented to the brake actuating fluid system. The reservoir contains a body of fluid which is in communication with the braking system when the master piston is in the retracted position. This provides for the expansion and contraction within the fluid system under various temperature conditions as well as providing a means for replenishing fluid due to leakage and vaporization in the brake actuating fluid system.

The conventional manner in venting the fluid system is through an opening in the cover of the master cylinder reservoir. This vent permits a certain amount of fluid to spill from the reservoir due to splash as the vehicle travels over the road. Accordingly, this invention is intended to overcome the leakage due to splashing through the cover in the master cylinder reservoir.

It is an object of this invention to provide a cover for a master cylinder reservoir which prevents the splashing of hydraulic fluid from the master cylinder reservoir when the vehicle is in operation.

It is another object of this invention to provide a venting means in the cover of the master cylinder reservoir which prevents splashing of fluid from the reservoir.

It is a further object of this invention to provide a cover for a master cylinder reservoir which prevents the splash of hydraulic fluid from the reservoir while the vehicle is in operation and also a means for preventing dirt from entering the fluid system through the venting means.

The objects of this invention are accomplished by constructing the master cylinder reservoir of a cylindrical shape. The master cylinder reservoir receives a baffle having small vents for permitting expansion within the fluid system and yet preventing the splash of fluid from escaping from the reservoir. The baffle is positioned within a reservoir cover which screws on to the reservoir and forms a seal on the lower portion of the baffle. The venting of the reservoir is through the holes in the baffle and radial grooves on the upper side of the baffle through the threaded portion of the outer periphery of the master cylinder reservoir. In this manner the air is permitted to escape though the venting means and yet the foreign material is prevented from entering the reservoir due to the particular structure of the reservoir and cover.

Further objects and advantages of the present invention will be apparent from the following description, reference being had to the accompanying drawings wherein preferred embodiments of the present invention are clearly shown.

In the drawings:

FIGURE 1 is a plan view with fragmentary sections broken away to show the baffle and the cover mounted on the top side of the master cylinder reservoir.

FIGURE 2 is a plan view of the baffle.

FIGURE 3 is a cross-section view showing the baffle and cover on the master cylinder reservoir.

The master cylinder 1 is formed with a flange 2 adapted for mounting on a motor vehicle. The forward end 3 of the master cylinder 1 has a means for connection to a hydraulic fluid system of the motor vehicle.

Referring to FIGURE 3, the casting forming the master cylinder 1 also forms an annular reservoir for reception of fluid for the hydraulic fluid system. The reservoir 4 has a threaded portion formed by the threads 5 on the outer periphery of the upper end of the reservoir 4.

The master piston 6 operates axially in the master cylinder 1 against the seal 7. The seal 7 is seated in its position on the forward side of the master piston 6 by the spring maintainer 8 biased to a rearward position by return spring 9.

The upper end of the reservoir 4 has a smooth facing 10 which engages a mating radial facing 11 on the baffle 12. The facing 10 of the reservoir 4 forms a seal with a mating surface 11 on the baffle 12.

The baffle 12 is firmly seated on the facing 10 of the reservoir through the force of the threaded portion of the outer periphery of the reservoir 4 as the cap 13 is screwed on the reservoir 4.

The cap 13 is provided with a threaded portion 14 on its lower end. The threaded portion 14 engages the outer periphery of the threads 5 of the master cylinder reservoir 4. No perforations are formed in cover 13.

The baffle 12 has a dome-shaped portion 16 formed in its central portion which is connected to the drip groove 17. The plurality of perforations 18 are formed in the drip groove 17. Referring to FIGURE 2, the radial slots 19 are formed on the upper portion of the baffle 12. The radial slots 19 are joined by the axial notches 20 formed on the outer periphery of the baffle 12.

The cover 13 has threads formed on its lower portion. The cover is constructed of a sheet material having a threaded portion wherein the threads have a smaller measurement between their major and minor diameters relative to the major and minor diameters of the threads on the reservoir 4.

The difference in the major and minor diameters of the threads formed on the cover 13 in relationship to the greater difference between the major and minor diameters of the threads on the reservoir 4 provide a helical groove between the cover and the root diameter of threads on the reservoir 4. The helical groove is in communication with the notches 20 and the radial grooves 19 to form a venting means together with the axial drip holes 18 in the baffle 12. The indirect passages formed by the threads prevent the entrance of foreign material to the reservoir and the baffle prevents the escape of fluid from the master cylinder reservoir due to splashing.

During the operation of the motor vehicle the fluid within the reservoir 4 splashes occasionally due to the roughness of the road as the vehicle is traveling. This splashing does not cause any escape of fluid from the reservoir. The splashing hits the baffle 12 and only a minute quantity ever passes through the perforations 18. Even though fluid does pass through the perforations 18, it is prevented from escaping by the cover 13. The fluid passing through the perforations 18 would not pass through the radial slots 19 directly due to the formation of the drip groove 17. Fluid which does pass through the perforations 18 settles back into the drip groove 17 and returns through the perforations 18 to the fluid body in the reservoir. A vent to the exterior of the reservoir is provided through the plurality of perforations 18 which extend axially through the baffle 12. The radial slots 19 provide a continuation of the venting means which are in communication with the axial notches 20 on the outer periphery of the baffle 12. The continuation of the venting passages is through the grooved portion on the outer periphery of the reservoir 4. It is noted that the root 27 of the threaded portion formed on the inner periphery of the cover 13 forms a threaded portion for engaging the outer periphery of the reservoir 4. The reservoir 4 is formed by a threaded portion having a thread root 28 and crest 29. The crest diameter 29 of the reservoir threads is substantially equal to the root diameter 27 of the threaded portion of the cover 13. This portion of the threads provides a locking means for the cover 13 on the reservoir 4.

The root diameter 28 of the threaded portion on the master cylinder 4, however, is a smaller diameter than the crest diameter 26 on the threaded portion of the cover 13. It is noted that as the cover 13 is threaded on the outer periphery of the reservoir 4 a helical passage 30 is formed between the cover 13 and the reservoir 4. This helical passage prevents the movement of foreign material upwardly into the reservoir and yet provides a passage for venting to permit the contraction and expansion of fluid body within the actuating fluid system of the vehicle brakes. The cover 13 may be formed of any suitable metal or material to provide a cover on the reservoir. The baffle 12, however, may be formed of a material such as a hard plastic or a softer material such as rubber, but in either case it forms a seal on the surface 10 on the upper end of the reservoir 4.

While the embodiments of the present invention as herein disclosed, constitute preferred forms, it is to be understood that other forms might be adopted.

What is claimed is as follows:

1. In a vehicle hydraulic brake actuating fluid system, the combination of, wall means forming a master cylinder reservoir chamber including a fill opening wall means at the top portion of the chamber, a loose baffle member positioned across the top of said fill opening wall means and having an annular portion resting on the top surface of said fill opening wall means, a separate cover threadedly engaging the exterior periphery of the fill opening wall means and having an annular portion engaging and seating said annular portion of said baffle member on the said top surface of said fill opening wall means, passage means through said baffle providing fluid connection between space between said cover and said baffle and said reservoir chamber, and other passage means in said annular portion of said baffle between the said annular portion and said annular portion of said cover forming vent means from said space between said baffle and said cover with atmosphere.

2. Apparatus constructed and arranged in accordance with the structure set forth in claim 1 wherein said other passage means comprised indent means in said annular portion of said baffle.

3. In a vehicle hydraulic brake actuating fluid system, the combination of, wall means forming a master cylinder reservoir chamber having a fill opening wall means at the top portion of the chamber, a loose baffle member positioned across the top of said fill opening wall means and having an annular portion resting on the top surface of said fill opening wall means, a separate cover having a thread portion engaging a thread portion on the exterior periphery of the fill opening wall means and having an annular portion engaging and seating said annular portion of said baffle member on the said top surface of said fill opening wall means, said thread portions having a nonmating relationship to provide thereby a spiral passage means therebetween, other passage means through said baffle providing fluid connection between a space between said cover and said baffle and said reservoir chamber, and additional passage means in said annular portion of said baffle between the just mentioned annular portion and said annular portion of said cover providing fluid connection between said space between said baffle and said cover and spiral passage to vent thereby the said space to atmosphere.

4. In a vehicle hydraulic brake actuating fluid system, the combination of, wall means forming a master cylinder reservoir chamber having a fill opening wall means at the top portion of the chamber, a loose baffle member positioned across the top of said fill opening wall means and having a central upwardly crowned portion with the periphery of the crowned portion extending into an annular axially extending portion forming with said crowned portion an annular trough the upper outer edge of which comprises an annular radially extending portion resting on the top surface of said fill opening wall means, a separate cover having a thread portion engaging a thread portion on the exterior periphery of the fill opening wall means and having an annular portion engaging and seating said annular portion of said baffle member on the said top surface of said fill opening wall means, said thread portions having a nonmating relationship to provide thereby a spiral passage means therebetween, other passage means through said baffle in the bottom portion of said trough providing fluid connection between a space between said cover and said baffle and said reservoir chamber, and additional passage means in said annular portion of said baffle between the just mentioned annular portion and said annular portion of said cover providing fluid connection between said space between said baffle and said cover and spiral passage to vent thereby the said space to atmosphere.

5. In a vehicle hydraulic brake actuating fluid system, the combination of, wall means forming a master cylinder reservoir chamber having a fill opening wall means at the top portion of the chamber, a loose baffle member positioned across the top of said fill opening wall means and having an annular portion resting on the top surface of said fill opening wall means, a separate cover having a thread portion engaging a thread portion on the exterior periphery of the fill opening wall means and having an annular portion engaging and seating said annular portion of said baffle member on the said top surface of said fill opening wall means, said thread portions having a nonmating relationship with the said thread portion on said cover having a smaller diametrical difference of the root diameter and crest diameter relative to the root diameter and crest diameter of the thread portion on the outer periphery of said fill opening wall means to provide thereby a spiral passage between said thread portions when said cover is placed on said fill opening wall means, passage means through said baffle providing fluid connection between a space between said cover and said baffle and said reservoir chamber, and additional passage means in said annular portion of said baffle between the just mentioned annular portion and said annular portion of said cover providing fluid connection between said space between said baffle and said cover and spiral passage to vent thereby the said space to atmosphere.

6. In a vehicle hydraulic brake actuating fluid system, the combination of, wall means forming a master cylinder reservoir chamber having a fill opening wall means at the top portion of the chamber, a loose baffle member positioned across the top of said fill opening wall means and having a central upwardly crowned portion with the periphery of the crowned portion extending into an annular axially extending portion forming with said crowned portion an annular trough the upper outer edge of which comprises an annular radially extending portion resting on the top surface of said fill opening wall means, a separate cover having a thread portion engaging a thread portion on the exterior periphery of the fill opening wall means and having an annular portion engaging and seating said annular portion of said baffle member on the said top surface of said fill opening wall means, said thread portions having a nonmating relationship with the said thread portion on said cover having a smaller diametrical difference of the root diameter and crest diameter relative to the root diameter and crest diameter of the thread portion on the outer periphery of said fill opening wall means to provide thereby a spiral passage between said thread portions when said cover is placed on said fill opening wall means, other passage means through said baffle in the bottom portion of said trough providing fluid connection between a space between said cover and said baffle and said reservoir chamber and additional passage means in said annular portion of said baffle between the just mentioned annular portion and said annular portion of said cover providing fluid connection between said space between said baffle and said cover and spiral passage to vent thereby the said space to atmosphere.

References Cited in the file of this patent

UNITED STATES PATENTS

| | | |
|---|---|---|
| 2,205,806 | Bélenkij | June 25, 1940 |
| 2,223,424 | Main | Dec. 3, 1940 |